(12) United States Patent
Zhang et al.

(10) Patent No.: US 11,532,000 B2
(45) Date of Patent: Dec. 20, 2022

(54) SYSTEMS AND METHODS FOR ALGORITHMIC PRICING

(71) Applicant: WALMART APOLLO, LLC, Bentonville, AR (US)

(72) Inventors: Sai Zhang, Foster City, CA (US); Peibei Shi, Foster City, CA (US); Quoc Tan Tran, Los Altos, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 560 days.

(21) Appl. No.: 16/159,603

(22) Filed: Oct. 12, 2018

(65) Prior Publication Data

US 2019/0114656 A1 Apr. 18, 2019

Related U.S. Application Data

(60) Provisional application No. 62/571,452, filed on Oct. 12, 2017.

(51) Int. Cl.
*G06Q 30/00* (2012.01)
*G06Q 30/02* (2012.01)
*G06Q 10/06* (2012.01)

(52) U.S. Cl.
CPC ....... *G06Q 30/0206* (2013.01); *G06Q 10/067* (2013.01); *G06Q 30/0202* (2013.01)

(58) Field of Classification Search
CPC ............. G06Q 30/0206; G06Q 10/067; G06Q 30/0202
See application file for complete search history.

(56) References Cited

U.S. PATENT DOCUMENTS 5,602,761 A * 2/1997 Spoerre ................ G01H 1/003
   702/179
7,996,331 B1   8/2011 Solanki et al.
   (Continued)

FOREIGN PATENT DOCUMENTS

WO   WO-2015041778 A1 * 3/2015 ......... G06Q 30/0206

OTHER PUBLICATIONS

Zhang et al., A Dynamic Pricing Strategy For A 3PL Provider With Heterogeneous Customers, https://prism.ucalgary.ca/bitstream/handle/1880/111534/Nault_ADyanamicPricing2015.pdf?sequence=1&isAllowed=y International Journal of Production Economics, 2015 (Year: 2015).*

*Primary Examiner* — Patricia H Munson
*Assistant Examiner* — Uche Byrd
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of calculating a halo weight for at least one item of a set of items, where the halo weight can comprise an effect sales of the at least one item has on sales of the set of items; calculating an item-wise elasticity for the at least one item; calculating a line-wise elasticity for the at least one item of the set of items; calculating an aggregate elasticity for the at least one item using the item-wise elasticity and the line-wise elasticity; calculating a demand forecast for the at least one item of the set of items; optimizing an objective function comprising the halo weight, the aggregate elasticity, the demand forecast, and at least one external constraint; adjusting at least one price of the at least one item based on the objective function, as optimized; and displaying the at least one price, (Continued)

as adjusted, on a display device. Other embodiments are disclosed herein.

20 Claims, 8 Drawing Sheets

(56) References Cited

U.S. PATENT DOCUMENTS

| | | | | |
|---|---|---|---|---|
| 8,078,485 | B1* | 12/2011 | Kraehmueller | G06Q 10/063 |
| | | | | 705/7.11 |
| 8,645,191 | B2 | 2/2014 | Subramanian | |
| 8,738,421 | B1* | 5/2014 | Ali | G06Q 30/0202 |
| | | | | 705/7.29 |
| 2005/0125341 | A1* | 6/2005 | Miri | G06Q 40/00 |
| | | | | 705/39 |
| 2008/0077459 | A1* | 3/2008 | Desai | G06Q 10/06314 |
| | | | | 705/7.24 |
| 2009/0063251 | A1* | 3/2009 | Rangarajan | G06Q 30/02 |
| | | | | 705/7.31 |
| 2013/0325551 | A1* | 12/2013 | Rosenberg | G06Q 30/0206 |
| | | | | 705/7.31 |
| 2014/0258355 | A1* | 9/2014 | Chu | G06F 17/18 |
| | | | | 708/446 |

* cited by examiner

Percentage of Items with Valid Elasticity Estimation

| Item-Wise Elasticity | Line-Wise Elasticity | Aggregated Elasticity |
|---|---|---|
| 53.6% | 67.1% | 77.4% |

US 11,532,000 B2

SYSTEMS AND METHODS FOR ALGORITHMIC PRICING

CROSS REFERENCES TO RELATED APPLICATIONS

This application claims the benefit of U.S. Provisional Application No. 62/571,452, which is herein incorporated by reference in its entirety.

TECHNICAL FIELD

This disclosure relates generally to computers, and more specifically to computer applications.

BACKGROUND

Many prior pricing systems and methods suffer from a slew of problems. Fist, prior pricing systems and methods are "dumb" i.e. they are not algorithmic, because they depend on human intuition of what individuals might pay for an item. Second, prior pricing systems and methods are short sighted because they concentrate on increasing sales and/or revenue for the specific item whose price is altered, and do not take into account the overall sales and/or revenue of an entire store or region. Thirdly, many prior computerized pricing systems and methods put undue processing/computational burden on the computer processor by computing an adjusted price for an unnecessarily large number of items. Finally, many prior computerized pricing systems and methods terminate and/or crash when run using incorrectly entered or bad data. This final problem can be significant when third parties outside of the entity determining the price submit the item data used in the pricing system. Therefore, there is a desire and a need for a pricing system that is dynamic, algorithmic, and increases overall sales for an entity while remaining computationally efficient and able to process incorrectly entered or bad data.

BRIEF DESCRIPTION OF THE DRAWINGS

To facilitate further description of the embodiments, the following drawings are provided in which.

Figure 1:
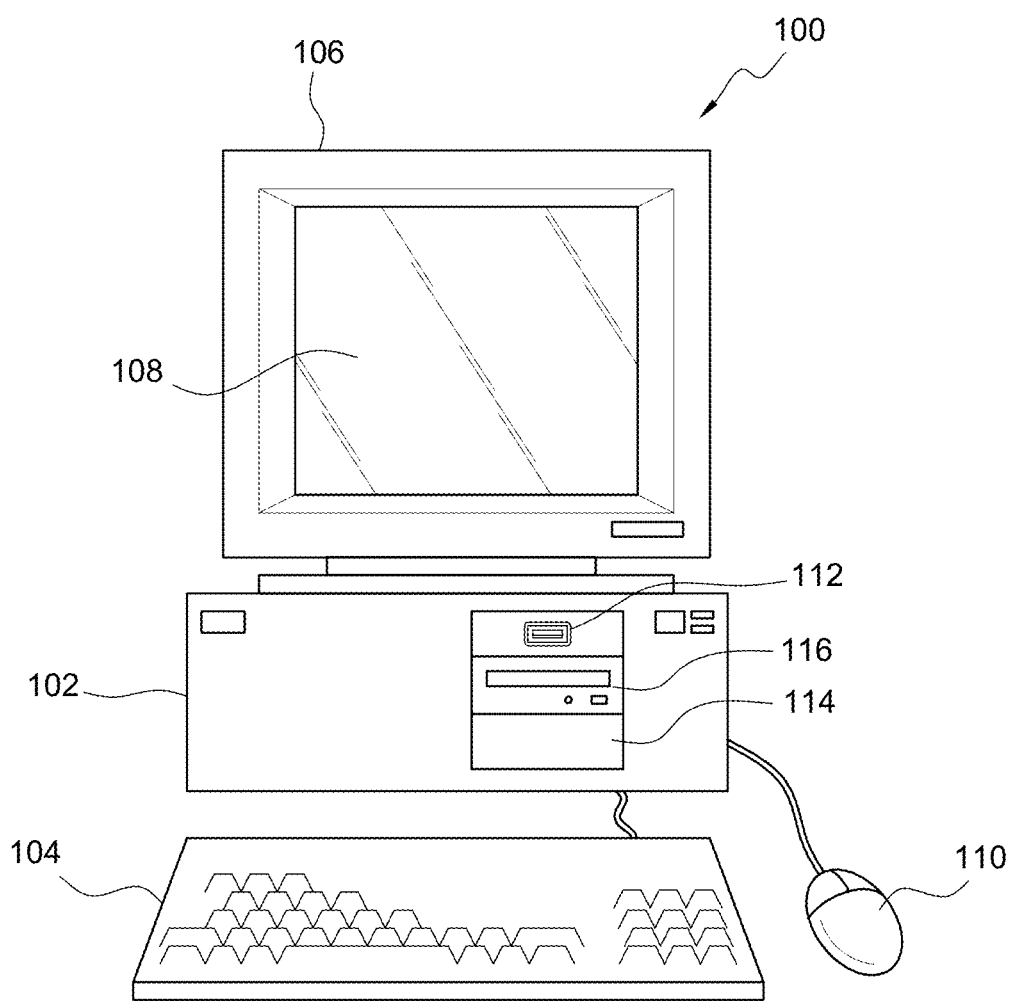
FIG. 1 illustrates a front elevational view of a computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform acts of calculating a halo weight for at least one item of a set of items, where the halo weight can comprise an effect sales of the at least one item has on sales of the set of items; calculating an item-wise elasticity for the at least one item; calculating a line-wise elasticity for the at least one item of the set of items; calculating an aggregate elasticity for the at least one item using the item-wise elasticity and the line-wise elasticity; calculating a demand forecast for the at least one item of the set of items; optimizing an objective function comprising the halo weight, the aggregate elasticity, the demand forecast, and at least one external constraint; adjusting at least one price of the at least one item based on the objective function, as optimized; and displaying the at least one price, as adjusted, on a display device.

Various embodiments include a method. The method can include calculating a halo weight for at least one item of a set of items, where the halo weight can comprise an effect sales of the at least one item has on sales of the set of items; calculating an item-wise elasticity for the at least one item; calculating a line-wise elasticity for the at least one item of the set of items; calculating an aggregate elasticity for the at least one item using the item-wise elasticity and the line-wise elasticity; calculating a demand forecast for the at least one item of the set of items; optimizing an objective function comprising the halo weight, the aggregate elasticity, the demand forecast, and at least one external constraint; adjusting at least one price of the at least one item based on the objective function, as optimized; and displaying the at least one price, as adjusted, on a display device.

Figure 2:
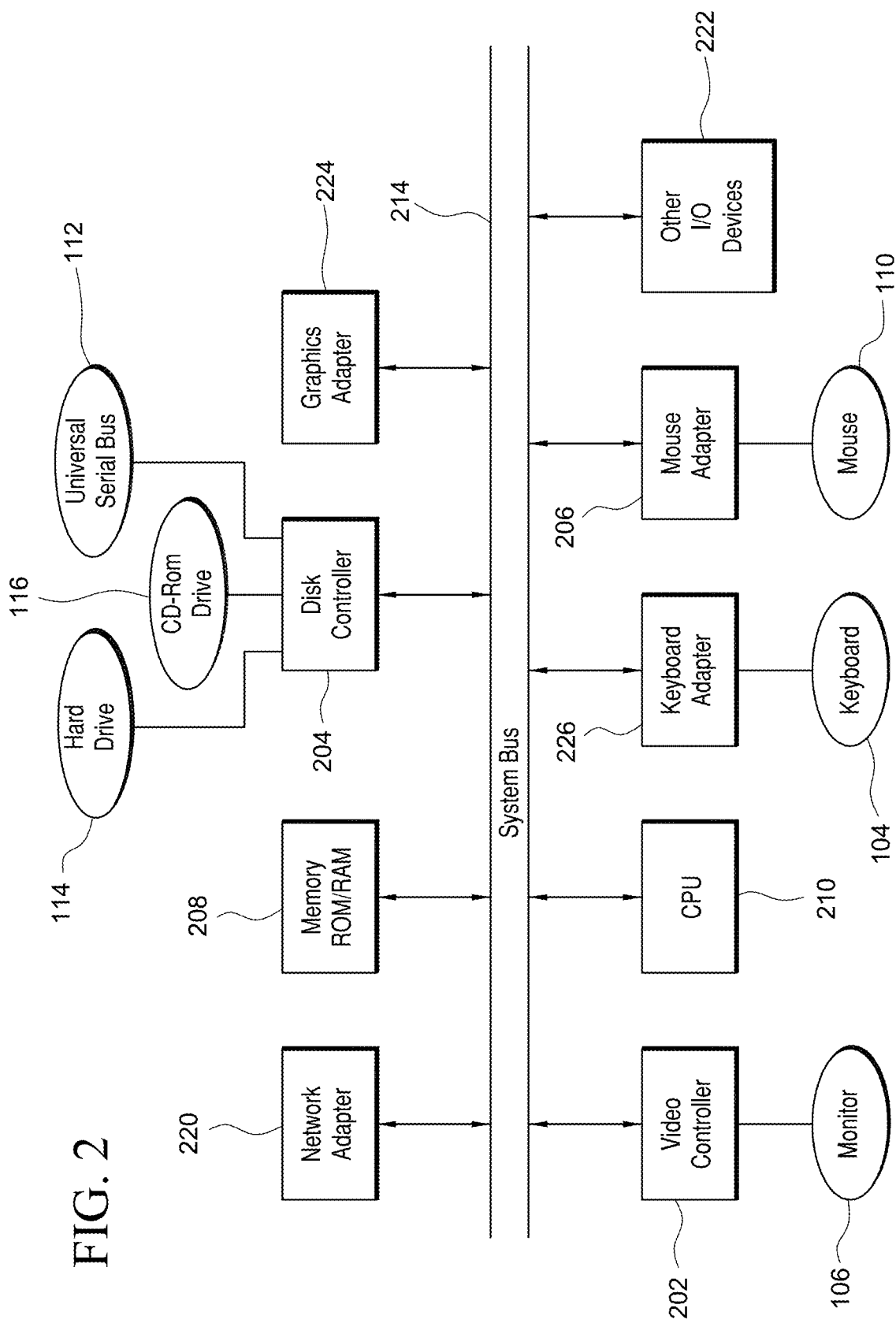
FIG. 2 illustrates a representative block diagram of an example of the elements included in the circuit boards inside a chassis of the computer system of FIG. 1.
Figure 3:
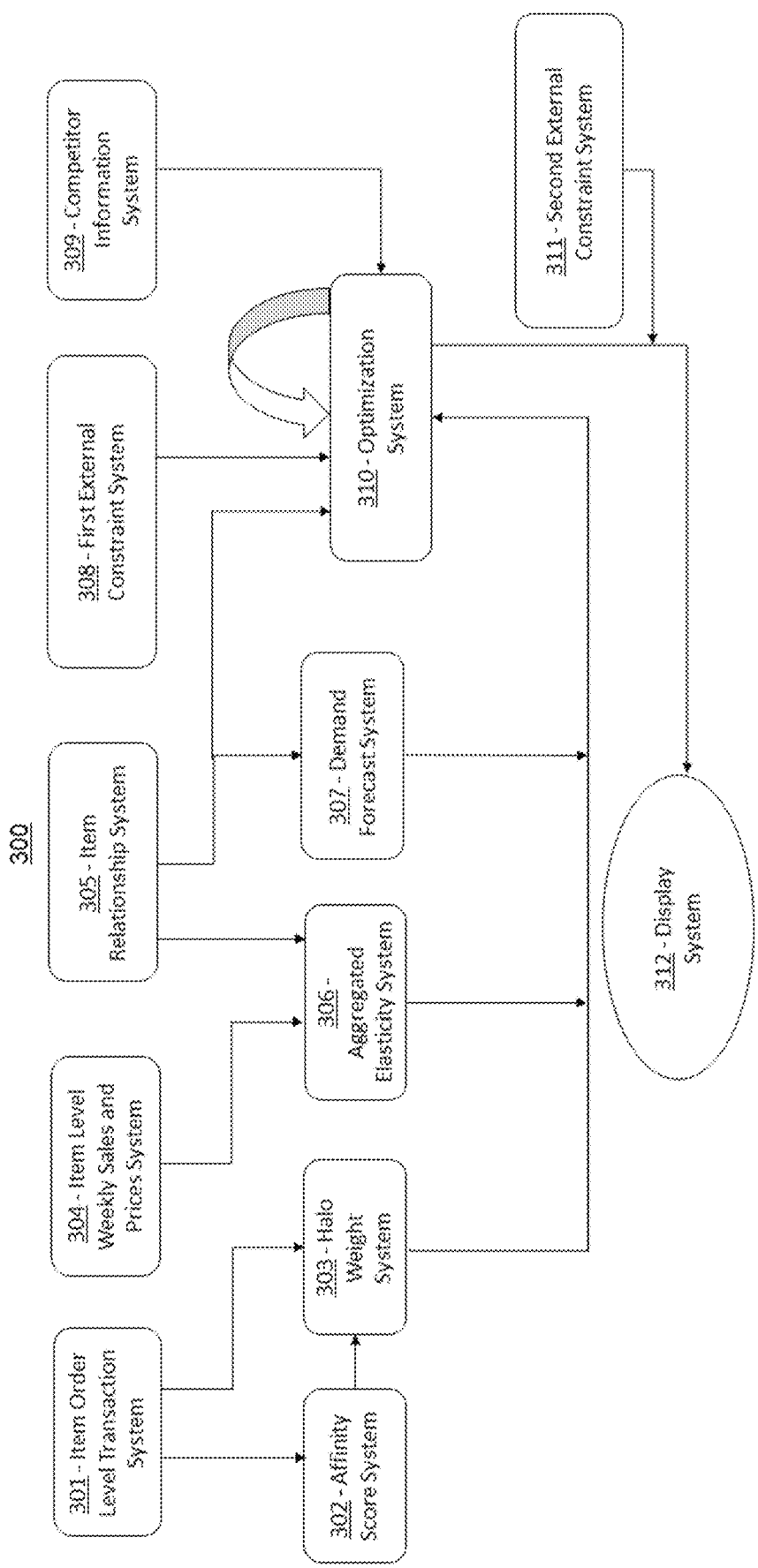
FIG. 3 illustrates a representative block diagram of a system, according to an embodiment.
Figure 4:
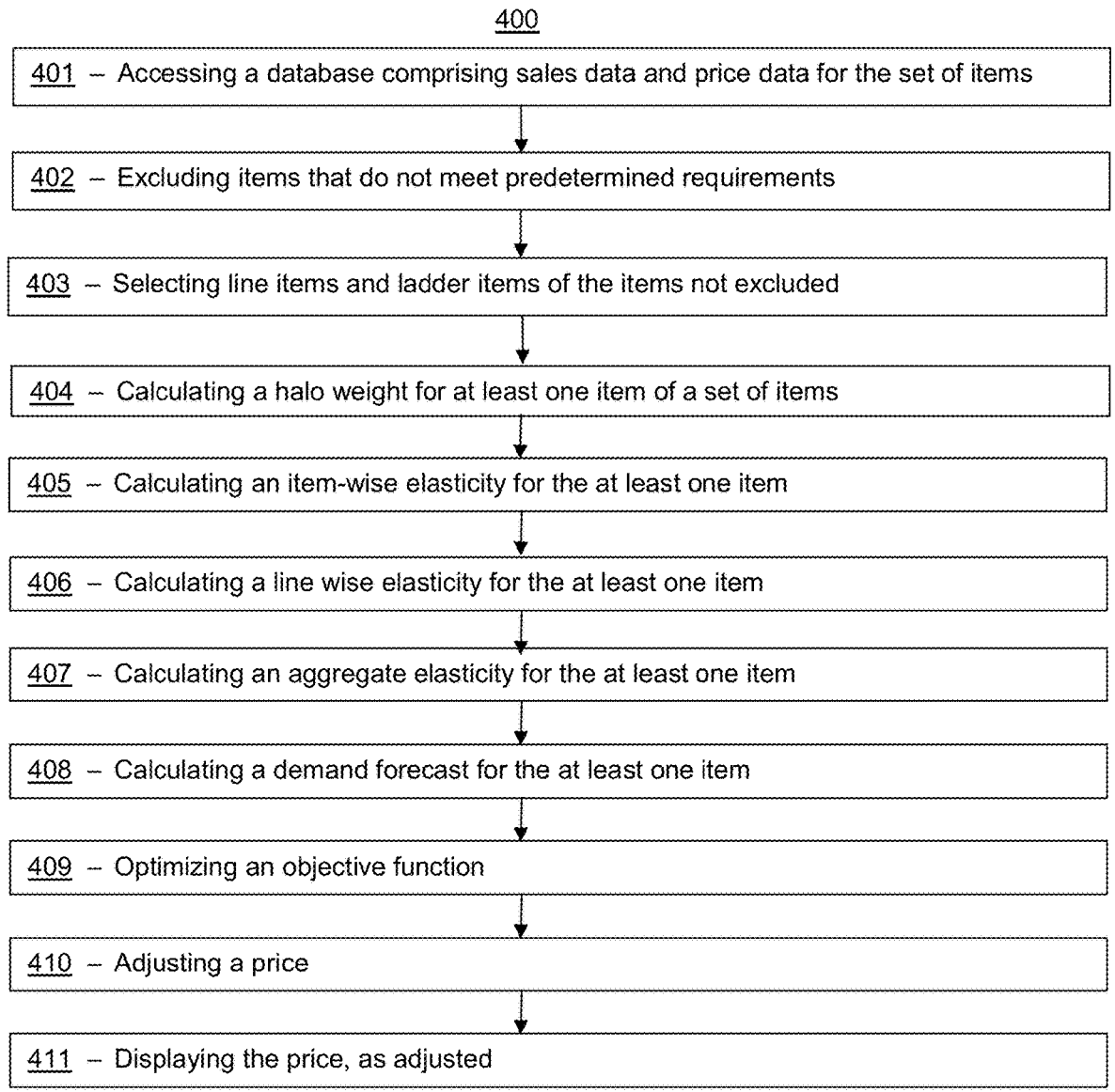
FIG. 4 is a flowchart for a method, according to certain embodiments.
Figure 5:
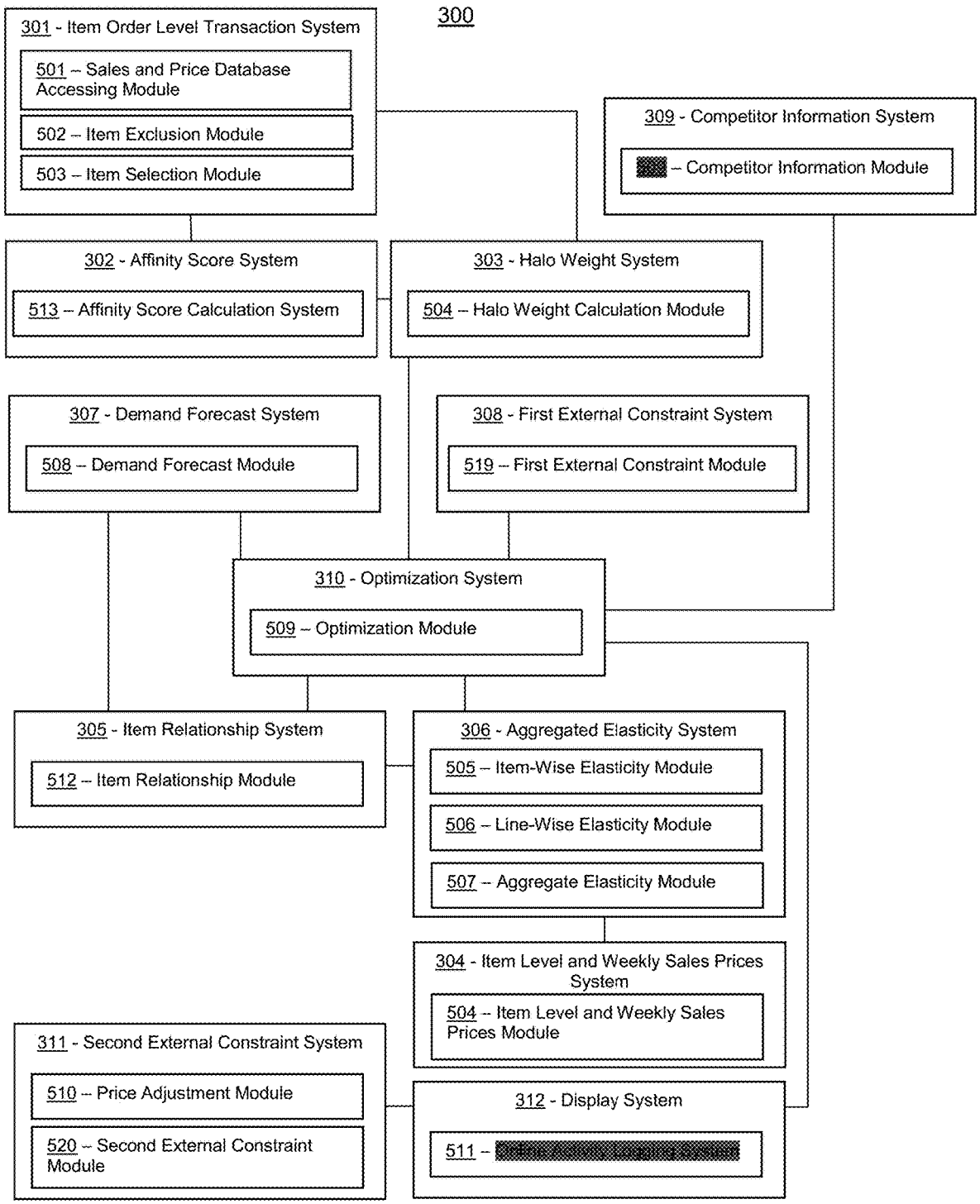
FIG. 5 illustrates a representative block diagram of a system, according to an additional embodiment.

Turning to the drawings, FIG. 1 illustrates an exemplary embodiment of a computer system 100, all of which or a portion of which can be suitable for (i) implementing part or all of one or more embodiments of the techniques, methods, and systems (such as the embodiments shown in and described with respect to FIGS. 3, 4, and 5) and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Turning ahead in the drawings, FIG. 3 illustrates a block diagram of a system 300 that can be employed for algorithmic pricing, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an item order level transaction system 301, an affinity score system 302, a halo weight system 303, an item level weekly sales and prices system 304, an item relationship system 305, an aggregated elasticity system 306, a demand forecast system 307, a first external constraint system 308, a competitor information system 309, an optimization system 310, a second external constraint system 311, and/or a display system 312. Item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 can each be a separate computer system, such as computer system 100 (FIG. 1), as described above, and can each be a single computer, a single server, or a cluster or collection of computers or servers, or a cloud of computers or servers. In another embodiment, a single computer system can host each of two or more of item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312. Additional details regarding item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and display system 312 are described herein.

In some embodiments, one or more of item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 can be hosted on one or more mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 can be in data communication with each other through an internet (not shown). In certain embodiments, item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 can be desktop computers, laptop computers, smart phones, tablet devices, and/or other endpoint devices. In the same or different embodiments, display system 312 can host one or more websites. For example, display system 312 can host an eCommerce website that allows users to browse and/or search for products, to add products to an electronic shopping cart, and/or to purchase products, in addition to other suitable activities.

In many embodiments, item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312. In a similar manner, the processing module(s) and the memory storage module(s) can be local and/or remote to each other.

In some embodiments, display system 312 can be referred to as a user computer. In some embodiments, item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 can communicate or interface (e.g., interact) with one or more customer computers (such as display system 312) through a network or internet (not shown). Internet (not shown) can be an intranet that is not open to the public. Accordingly, in many embodiments, item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 (and/or the software used by such systems) can refer to a back end of system 300 operated by an operator and/or administrator of system 300, and user computers display system 312 (and/or the software used by such systems) can refer to a front end of system 300 used by one or more users (not shown), respectively. In some embodiments, users also can be referred to as customers, in which case, user computers can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Item elasticity estimation, demand forecast, and pricing optimization for items is an underdeveloped area for algorithm-based dynamic pricing. In this application, an algorithm-based pricing strategy for items is disclosed.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules. Such non-transitory memory storage modules can be part of a computer system such as item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 (FIGS. 3 & 5). The processing module(s) can be similar or identical to the processing module(s) described above with respect to computer system 100 (FIG. 1).

In many embodiments, method 400 can comprise an activity 401 of accessing a database comprising sales data and price data for a set of items. In some embodiments, sales data and/or price data can comprise weekly sales, price, quantity sold, quantity available etc. In the same of different embodiments, a set of items can comprise a set of items and/or products sold by a retailer at one or more brick and mortar stores or on an ecommerce marketplace. In some embodiments, activity 401 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, method 400 can comprise activity 402 of excluding items from the set of items that do not meet predetermined requirements. In some embodiments, predetermined requirements can comprise an item having stable sales over a period of time. In the same or different embodiments, predetermined requirements can comprise an item being available in a certain number of stores. For example, an item that is sold in at least 10 stores for at least 2 years can be considered to have stable sales, but items sold in fewer stores for a shorter period of time can also show stable sales. In some embodiments, activity 402 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, method 400 can further comprise activity 403 of selecting line items and ladder items of the items not excluded from the set of items. In some embodiments, line items can comprise similar or the same items with differing properties. For example, line items can have different colors, different flavors, different clothing sizes (but not different volumes or quantities), etc. As another example, different flavors of a certain brand of chocolate with the same net weight can be items in a line. As a further example, the same article of clothing in different sizes can be items in a line. In various embodiments, ladder items can comprise the same or similar items, but that are sold in a different volume and/or quantity. For example, a soda in 500 milliliter (ml) and 1 liter (L) volumes can be items in a ladder. As another example, laundry detergent in different volumes coming from the same brand with the same scent can be items in a ladder. In some embodiments, activity 403 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

An item weighting strategy is disclosed called halo weight. Halo weight is configured to quantify the halo effect that each item contributes to the total store sales, and can be defined as the total revenue generated by each sold unit of an item. The halo effect occurs when promoting one item influences individuals to purchase another item. For example a week prior to the Super Bowl, a grocery chain decides to promote a specific soda brand. That, in turn, influences the individual to buy a bag of chips. This would be considered the halo effect of promoting the specific soda brand, the purchase decision spills over from the beverages category to snacks.

In many embodiments, method 400 can further comprise activity 404 of calculating a halo weight for at least one item of a set of items. As noted herein, the halo weight can comprise an effect that the sales of the at least one item has on the aggregate sales of the entire set of items. In some embodiments, halo weight can be calculated using the following equation:

$$w_A = \frac{\text{halo } revenue_A}{unit_A},$$

wherein $w_A$ comprises the halo weight for the at least one item, halo $revenue_A$ comprises a halo revenue generated by the at least one item (also known as item A), and $unit_A$ comprises a number of units of the at least one item sold. In the same or different embodiments, halo revenue can comprise an amount of total revenue, which can include sales due to the halo effect of the item, generated at a store for each unit of an item sold. In various embodiments, halo revenue can be calculated using the following equation: halo revenue$_A = \Sigma_{\{set\ of\ items\ B\}}$revenue$_B$, wherein a set of items B comprise a set of items whose sales increase with sales of the at least one item. In many embodiments, set of items B can be chosen using the following equation: {set of items B}={B: A and B are bought in the same order, and affinity$_{A \to B} \geq 4$}. In the same or different embodiments, Affinity$_{A \to B}$, can be greater than or equal to other values as chosen by an administrator. In various embodiments, affinity$_{A \to B}$ can be greater than or equal to a value determined for a quantile of the affinity scores calculated based on all pairwise combinations of items. For example, affinity$_{A \to B}$ can comprise approximately the 95% quantile, 92% quantile, 90% quantile, etc. Affinity$_{A \to B}$, otherwise known as the affinity score between item A and set of items B, can generally be seen as a strength of the halo effect that set of items B receive from item A. In some embodiments, affinity$_{A \to B}$ can be calculated using the following question:

$$affinity_{A \to B} = \frac{P(B|A)}{P(B|\text{not }A)} = \frac{n_{AB}/n_A}{(n_B - n_{AB})/(n - n_A)},$$

wherein P(B|A) comprises a probability that a customer will purchase item B given that the customer purchases item A in the same order, P(B|not A) comprises a probability that a customer will purchase item B when the customer does not purchase item A in the same order, $n_{AB}$ comprises a number of transactions where item A and one or more items of set of items B are bought together, $n_A$ comprises a number of transactions in which item A is purchased, $n_B$ comprises a number of transactions in which one or more items of set of items B are bought, and n comprises a total number of orders analyzed. Therefore, the higher an affinity score is, the stronger the chance is that a purchase of item A will drive the purchase of one or more items of set of items B.

In some embodiments, activity 404 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, method 400 can further comprise activity 405 of calculating an item-wise elasticity for the at least one item. In some embodiments, price change and sales change units of an item across all available stores can be integrated to estimate item-wise elasticity. In various embodiments, item-wise elasticity can comprise an elasticity estimation of price for the at least one item. In various embodiments, item-wise elasticity can be calculated using the following equation:

$$\frac{dQ(P)}{Q(P)} = \gamma \frac{dP}{P},$$

where Q(P) comprises sales of an item at price P and $\gamma$ comprises the item-wise elasticity for the item. The following formula can be used as an approximation to the item-wise elasticity equation (1):

$$\frac{\Delta Q}{Q} = \gamma \frac{\Delta P}{P}.$$

To estimate $\gamma$ for each item, price changes $$\left(\frac{\Delta P}{P}\right)$$

and sales unit changes $$\left(\frac{\Delta Q}{Q}\right)$$

across all the stores for the item can be collected, and a robust linear regression can be used to get an estimation for $\gamma$. In some embodiments, points where relative price changes $$\frac{\Delta P}{P} \leq 2\%$$

can be removed. In the same or different embodiments, points where relative price changes $$\frac{\Delta P}{P}$$

are less than between 2% and 5% can be removed. In various embodiments, $$\frac{\Delta P}{P}$$

can be less than a percentage value determined by an administrator.

In some embodiments, activity 405 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location. One potential drawback of performing algorithmic pricing using only the item-wise elasticity is that item-wise elasticity cannot provide an estimation if there is insufficient price changes over a certain item. This drawback is due to the fact that items with insufficient price changes in their history lead to too few regression points, therefore leading to a valid estimation.

In order to improve the coverage of an elasticity estimation and to get an accurate approximation of an elasticity for items with insufficient price changes over a specific period of time, line-wise elasticity is used in combination with a traditional elasticity estimation. The line-wise elasticity estimation is based on the fact that items in the same line are generally very similar and generally have the same price, and therefore they also have similar price elasticity. For example, milk chocolate from a specific brand should have the same price as its dark chocolate counterpart. Such line-wise elasticity can have better accuracy when compared with item-wise elasticity, and can also have a broader level coverage for estimation among all the items in the line. As an example, for each store, price changes $$\left(\frac{\Delta P}{P}\right)$$

and sales unit changes $$\left(\frac{\Delta Q}{Q}\right)$$

for all the items in me same line can be collected, and the above price change units of all the stores can be combined as training data for a single robust regression.

In many embodiments, method 400 can comprise activity 406 of calculating a line-wise elasticity for the at least one item. In some embodiments, line-wise elasticity comprises an assumption that items in a line can have approximately the same elasticity. In various embodiments, price changes $$\frac{\Delta P}{P}$$

and sales unit changes $$\frac{\Delta Q}{Q}$$

are calculated for each item in a set of items. In the same or different embodiments, the calculated price changes and sales unit changes of the set of items can be placed together in the same line, and a linear regression can be run to fit an elasticity to that line. In some embodiments, activity 406 can further comprise gathering price changes for at least one item in a line of item A over a first period of time. In the same or different embodiments, activity 406 can further comprise gathering changes in units sold for at least one item in a line of item A over a second period of time. In many embodiments, the first period of time can be the same, different, and/or overlapping period of time than the second period of time. In various embodiments, a line of item A can be determined by an administrator of the system or a third party. In many embodiments, activity 406 can further comprise performing a regression analysis on the combined changes in price for at least one item in a line of item A over the first period of time. The various embodiments, activity 406 can further comprise performing a regression analysis on the combined changes in units sold for at least one item in a line of item A over the second period of time. In the same or different embodiments, activity 406 can further comprise performing a single regression of the combined changes in price for at least one item in a line of item A over the first period of time and the combined changes in units sold for at least one item in a line of item A over the second period of time. In some embodiments, activity 406 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Figure 6:
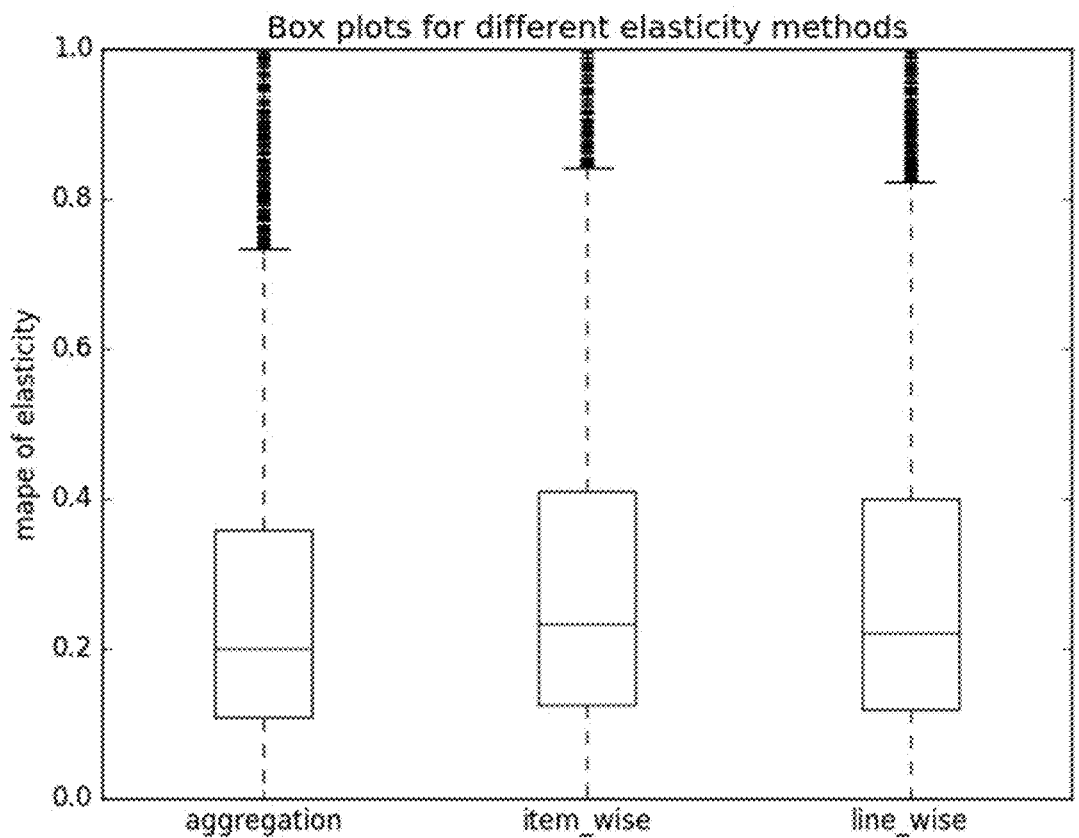
FIG. 6 illustrates graphical and tabular displays of data gathered from different elasticity estimation methods, according to certain embodiments.

Coverage of an elasticity estimation can further be enhanced by performing an elasticity aggregation. For example, results of an accuracy of an elasticity aggregation as compared to a pure item-wise and a pure line-wise elasticity estimation is shown in FIG. 6. In some embodiments, MAPE can comprise a mean absolute percentage error. FIG. 6. shows a boxplot of MAPE values of all items for each method of elasticity aggregation shown. In FIG. 6, a central rectangle spans a first quartile to a third quartile (also known as an interquartile range or IQR). A segment inside the rectangle shows a median and "whiskers" above and below the box show locations of minimum and maximum values. Based on FIG. 6, it can be determined that a median, together with other summary statistics shown in FIG. 6, of an aggregation method is smaller than pure line-wise and pure item-wise elasticity estimations. Therefore, the accuracy of an elasticity estimation based on an aggregation method is better due to the aggregation having smaller error metrics as compared to pure line-wise and pure item-wise elasticity estimations. In some embodiments, an elasticity estimation method with a smallest performance error can be chosen as a most valid method.

Returning now to FIG. 4, in many embodiments, method 400 can comprise activity 407 of calculating an aggregate elasticity for the at least one item. In some embodiments, aggregated elasticity can be calculated based on item-level elasticity, line-wise elasticity, and item relationship. In various embodiments, items with a valid line-wise elasticity can have their line-wise elasticity used as an aggregate elasticity. In the same or different embodiments, when an item does not have a valid line-wise elasticity, its item-level elasticity can be used as an aggregate elasticity. In many embodiments, when an item has neither line-wise nor item-wise elasticity, average elasticity for items with an elasticity in the same ladder, variety ladder, and/or PB-NB group can be used as an aggregate elasticity. In some examples, the aggregate elasticity can be calculated from the item-wise elasticity and the line-wise elasticity. In one of these examples, for each item, line level elasticity can be computed first, and items with no elasticity estimation can have their elasticity imputed using ladder, variety ladder, and/or PB-NB grouping average elasticity. In various embodiments, a variety ladder can comprise items with differing quality or premium level within the same brand. For example, regular milk and premium organic milk can comprise a variety ladder. In the same or different embodiments, PB-NB can comprise private-brand and national-brand items, respectively. For example, a store band item can comprise a private-brand item, and non-store brands can comprise national-brand items. In various embodiments, similar items of a private brand and/or a national-brand can comprise a PB-NB group. In some embodiments, activity 407 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Due to the fact that each item in the set of items has sales recorded across multiple stores, the use of two methods of demand forecasting is disclosed. This dual method forecasting has the advantage of providing predicted sales of an item over an entire market, as opposed to individual stores. The first is summing up demand forecast at each store, namely calculating the predicted sales for each item in each store, and then take a sum over all the stores. The second is demand forecast at market level based on aggregated data. Alternatively, it means to first aggregate the data across all the stores to get a market-level sales data, and then, do a single prediction based on aggregated data. The second method turns out to be computationally more efficient than the first method, and also provides a more accurate market level demand forecast, as shown in FIG. 7 and FIG. 8.

Figure 7:
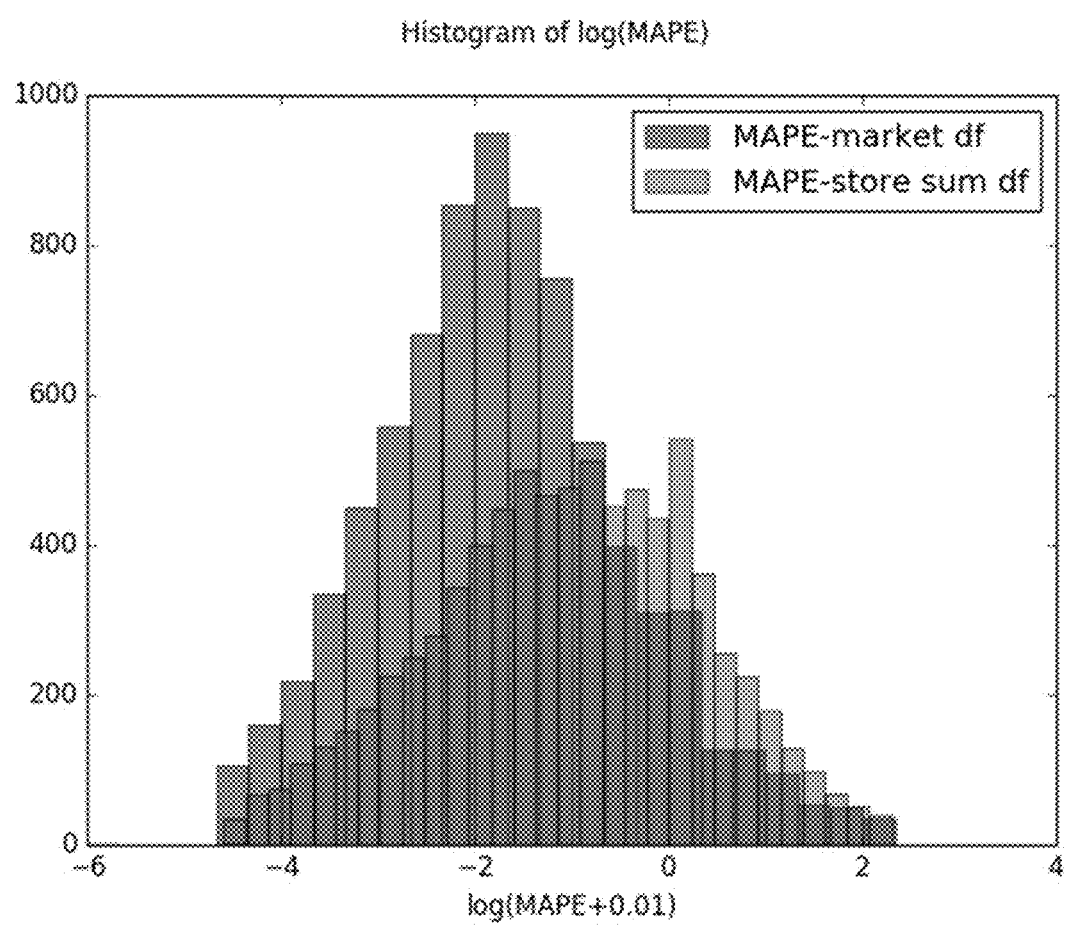
FIGS. 7-8 illustrate graphical displays of data gathered from different demand forecasting methods.

Turning now to FIG. 7, in some embodiments, MAPE can comprise mean absolute percentage error, which can be a measure of an accuracy of a forecast value. In various embodiments, DF can comprise a demand forecast. Two histograms showing a difference of MAPE of items between two prediction methods (e.g., market level demand forecast and store sum demand forecast) are shown in FIG. 7. FIG. 7 further comprises a Y-axis displaying a frequency of a number of items corresponding to each log(MAPE+0.1) value on an X-axis. In FIG. 7, a histogram of market level demand forecast MAPE is on a left side of store sum demand forecast MAPE. This leads to the conclusion that market level demand forecast, from a distribution level, has superior error metrics when compared with store sum demand forecast.

Figure 8:
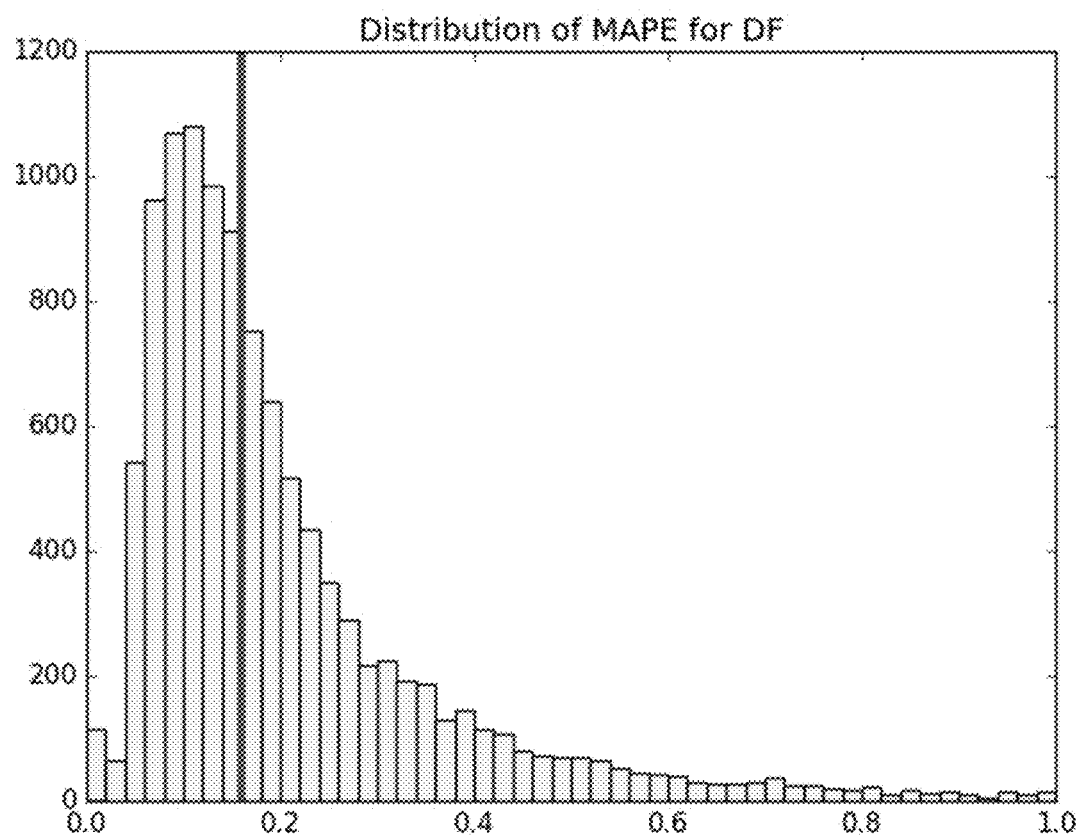

Turning now to FIG. 8, a distribution of error metrics of market level demand forecast is shown. In other words, FIG. 8 shows a distribution of MAPE for items using market level demand forecast. A bar stretching from top to bottom indicates a median of the distribution.

Returning now to FIG. 4, in many embodiments, method 400 can comprise activity 408 of calculating a demand forecast for at least one item. In some embodiments, a demand forecast can be calculated by first summing up a demand forecast over a predefined period of time for each store of a set of scores for at least one item. In the same or different embodiments, a predefined period of time can be 1 week, 2 weeks, 5 weeks, 10 weeks, 1 year, 2 years, 5, years, 10 years, etc. This approach, though, can be computationally intensive due to the fact that a demand forecast is calculated for each individual item in each individual store, and modern stores can carry thousands upon thousands of items. In various embodiments, a demand forecast can be calculated by aggregating sales data and price data for the at least one item across one or more stores over a predefined period of time to produce market level sales data for the at least one item in the set of items, and then performing a demand forecast on the market level sales data and price data. In other words, a demand can be calculated in the aggregate for an entire market. This approach has the advantage of being computationally less intensive, and therefore allows the demand forecast to be calculated faster and with less of a burden on the processor. Further, as described above, it produces more accurate forecasts.

In many embodiments, a demand forecast can be calculated using at least one of an exponential weighted moving average (EWMA) model, a generalized linear model with a log-link function, or an autoregressive moving average (ARMA) model. In the same or different embodiments, a demand forecast can be calculated using one or more of multiple different models (e.g. EWMA, a generalized linear model with a log-link function, or ARMA), and the results of each forecasting model can be compared. In various embodiments, time series data for each item is split into training data and test data. In the same or different embodiments, a demand forecast is then calculated using one or more of multiple different models (e.g. EWMA, a generalized linear model with a log-link function, or ARMA) on training data for each item. In many embodiments, one or more of multiple different models (e.g. EWMA, a generalized linear model with a log-link function, or ARMA) are applied to an item's test data to calculate error metrics for each model of one or more of multiple models (e.g. EWMA, a generalized linear model with a log-link function, or ARMA). In various embodiments, a model with a smallest error metric can then be used as a best or most accurate model for this item. In the same or different embodiments, a chosen best model can be fit using a full dataset for an item. In some embodiments, a demand forecast using a chosen best model can be used as predicted sales for an item. For example, for item1, an EWMA model is selected because the EWMA model has a lowest model error among multiple different models. On the other hand, an ARMA model can be selected for item2 because the ARMA model outperforms multiple different models based on error metrics. The results of a most accurate chosen model of these models can then be chosen, and forwarded to optimization system 310 (FIG. 3). In a subsequent step, an objective function can comprise the best model for the at least one item. As an example, the best model can comprise a model showing smallest error metrics, as described above. In some embodiments, activity 408 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

After calculating item halo weight, elasticity, and demand forecast as described above, these outputs are forwarded to optimization system 310 (FIG. 3). Optimization system maximizes projected overall market sales by optimally solving prices for pre-selected items. The intuition is that by decreasing prices for certain items, more customers are attracted to shop at a retailer and buy products not limited to items with an adjusted price. In other words, in some embodiments, the goal is to obtain optimized prices for items such that total expected volume for all products (not just the items with optimized prices), as weighted by the proposed halo effect, is maximized, which can be subject to constraints such as a total investment budget, price swing bounds, and item integrity constraints. In some embodiments, a total investment budget constraint can comprise a total revenue loss due to a price adjustment not exceeding a budget set by an administrator. In the same or different embodiments, a price swing bounds constraint can comprise an adjusted price of each item not deviating from a current price by more than approximately 10%. In many embodiments, an item integrity constraint can comprise, for items in a line, ladder, variety ladder, or PB-NB group, satisfying predetermined relational constraints (e.g. all private brand items having a lower price than national brand items or premium items in a variety ladder having a higher price than normal items in a variety ladder). As explained below, examples of integrity constraints include line constraint (e.g., items with different colors or flavors should be priced the same) and ladder constraint (e.g., items of different pack size should satisfy certain price gap). In many embodiments, a competitor price constraint can comprise an item having a lower price than the same item sold by a competitor.

In many embodiments, method 400 can comprise activity 409 of optimizing an objective function. As an example, the objective function can comprise the halo weight, the aggregate elasticity, the demand forecast, and at least one external constraint. In the same or different embodiments, an objective function can comprise: $\max \Sigma_i w_i(v_i + \gamma_i(p_i - \hat{p}_i))$, where $w_i$ comprises halo weight for at least one item, $v_i$ comprises a demand forecast of the at least one item at price point $\hat{p}_i$, $\gamma_i$ comprises a linearized elasticity of the at least one item, and $p_i$ comprises an optimized price of the at least one item.

In some embodiments, as noted above, an external constraint can be placed on the optimization of the objective function. In the same or different embodiments, external constraints can be placed on the optimization of the objective function by an administrator and/or a third party. In some embodiments, an external constraint can comprise an adjusted price being lower than a pre-adjustment price, a total profit loss due to an adjusted price of an item being lower than a predetermined budget, private label or premium items having a lower price than corresponding national brand or generic items, items in a line having the same price, and/or items in a ladder having a lower unit price for items with a higher unit volume than an item with an adjusted price and a lower unit volume (e.g. a 32 roll pack of toilet paper has a lower per roll price than a 16 roll pack of toilet paper). In the same or different embodiments, more than one external constraint may be placed on an optimization of the objective function. In various embodiments, different external constraints may be placed on optimization of an objective function depending on the business objectives of the entity operating the algorithm. For example, a constraint comprising items in a line having the same price can be imposed because customers may not purchase more expensive items that only differ in color or flavor. As a further example, a constraint comprising items in a ladder having a lower unit price for items with a higher unit volume than an item with an adjusted price and a lower unit volume can be imposed because customers may not purchase bulk items or may over-purchase single units if single units have a lower unit price than bulk units. In this example, sales of single units would be inflated, and the desired halo effect may be lessened. In some embodiments, constraints applied to an algorithm can be determined based on goals of the operator or third parties.

In some embodiments, activity 409 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, method 400 can comprise activity 410 of adjusting a price. As an example, the price can be adjusted based on the objective function, as optimized. In some embodiments, a price can be adjusted multiple times, as described above for activity 409. In the same or different embodiments, a price can be adjusted in real time as optimization is completed. In some embodiments, activity 410 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location. In various embodiments, errors in the disclosed algorithm may arise due to the imposition of multiple, conflicting constraints, and these errors can be identified during activities 409 and/or 410. These conflicting constraints may be due to input of bad data by an administrator of the item relationship system 305 (FIG. 3). For example, a pre-adjustment price of a 16 roll pack of toilet paper may be $16.00 ($1.00 per roll), and an adjusted price may be $8.00 ($0.50 per roll). A conflict can arise in this example when a 32 roll pack of toilet paper (a ladder item) has a price of $24.00 ($0.75 per roll). As another example, assume items A and B belong to a line group, and items D and E belong to a different line group. Therefore, items A and B should have the same price, and items D and E should have the same price. Meanwhile, items A and D are in a ladder group, and item A has a smaller volume than item D. Further, assume that items B and E belong to a private-national brand group where B is national brand and E is private brand. Given the relationships described in this example, item A should have a higher price than item D, item B should have a higher price than item E, and item A should have the same price as B. In this example, item B and D cannot satisfy all constrains and have the same price. The error posed in this example can be compounded with a retailer who sells thousands of items, and many items are in several relational groups. Therefore, by iteratively applying constraints, as described above, these errors can be avoided.

In embodiments where conflicts arise, a more robust algorithm is needed to resolve these conflicts without creating a fatal error. In these embodiments, optimization of an objective function can be performed with a first constraint applied, and an adjusted price can be calculated. A second constraint can then be applied to the adjusted price to produce a second adjusted price. Subsequent external constraints can also be applied to the second adjusted price until all external constraints are satisfied. Therefore, in some embodiments, at least one external constraint can comprise at least two (or three or four, etc.) external constraints. In the same or different embodiments, activity 409 can further comprise identifying a conflict between at least two (or three or four, etc.) external constraints. In various embodiments, activity 409 can further comprise applying a first external constraint to optimization of an objective function and applying a second external constraint to an adjusted price to create a second adjusted price. In many embodiments, a first external constraint can be applied to optimization of an objective function, and a second external constraint can be applied to optimization of an objective function. In the same or different embodiments, a first external constraint can be applied to a price as adjusted to create a second adjusted price, and a second external constraint can be applied to the second adjusted price to create a third adjusted price. This iterative method of applying external constraints can proceed for as many external constraints as needed. In this way, multiple, conflicting constraints can be applied to the algorithm without causing fatal crashes of system 100 and/or system 300 that can halt or hinder method 400 from proceeding to completion.

In many embodiments, method 400 can comprise activity 411 of displaying a price, as adjusted. In some embodiments, a price can be displayed on a display device, such as a computer screen, mobile device screen, and/or a price tag in a brick and mortar store. In some embodiments, activity 411 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

FIG. 5 illustrates a block diagram of a portion of system 300 comprising item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312, according to the embodiment shown in FIG. 3. Each of item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 is merely exemplary and not limited to the embodiments presented herein. Each of item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 can be employed in many different embodiments or examples not specifically depicted or described herein. In some embodiments, certain elements or modules of item order level transaction system 301, affinity score system 302, halo weight system 303, item level weekly sales and prices system 304, item relationship system 305, aggregated elasticity system 306, demand forecast system 307, first external constraint system 308, competitor information system 309, optimization system 310, second external constraint system 311, and/or display system 312 can perform various procedures, processes, and/or acts. In other embodiments, the procedures, processes, and/or acts can be performed by other suitable elements or modules.

In many embodiments, item order transaction system 301 can comprise non-transitory memory storage module 501. Memory storage module 501 can be referred to as sales and price database accessing module 501. In many embodiments, sales and price database accessing module 501 can store computing instructions configured to run on one or more processing modules and perform a portion of or one or more acts of method 400 (FIG. 4) (e.g., activity 401 (FIG. 4)). In the same or different embodiments, item order transaction system 301 can comprise non-transitory memory storage module 502. Memory storage module 502 can be referred to as item exclusion module 502. In many embodiments, item exclusion module 502 can store computing instructions configured to run on one or more processing modules and perform a portion of or one or more acts of method 400 (FIG. 4) (e.g., activity 402 (FIG. 4)). In various embodiments, item order transaction system 301 can comprise non-transitory memory storage module 503. Memory storage module 503 can be referred to as item selection module 503. In many embodiments, item selection module 503 can store computing instructions configured to run on one or more processing modules and perform a portion of or one or more acts of method 400 (FIG. 4) (e.g., activity 403 (FIG. 4)).

In many embodiments, halo weight system 303 can comprise non-transitory memory storage module 504. Memory storage module 504 can be referred to as halo weight calculation module 504. In many embodiments, halo weight calculation module 504 can store computing instructions configured to run on one or more processing modules and perform a portion of or one or more acts of method 400 (FIG. 4) (e.g., activity 404 (FIG. 4)).

In many embodiments, affinity score system 302 can comprise non-transitory memory storage module 513. Memory storage module 513 can be referred to as affinity score calculation module 513. In many embodiments, affinity score calculation module 513 can store computing instructions configured to run on one or more processing modules and perform a portion of or one or more acts of method 400 (FIG. 4) (e.g., activity 404 (FIG. 4)).

In many embodiments, aggregated elasticity system 306 can comprise non-transitory memory storage module 505. Memory storage module 505 can be referred to as item-wise elasticity module 505. In many embodiments, item-wise elasticity module 505 can store computing instructions configured to run on one or more processing modules and perform one or more acts of method 400 (FIG. 4) (e.g., activity 405 (FIG. 4)). In the same or different embodiments, aggregated elasticity system 306 can comprise non-transitory memory storage module 506. Memory storage module 506 can be referred to as line-wise elasticity module 506. In many embodiments, line-wise elasticity module 506 can store computing instructions configured to run on one or more processing modules and perform one or more acts of method 400 (FIG. 4) (e.g., activity 406 (FIG. 4)). In various embodiments, aggregated elasticity system 306 can comprise non-transitory memory storage module 507. Memory storage module 507 can be referred to as aggregate elasticity module 507. In many embodiments, aggregate elasticity module 506 can store computing instructions configured to run on one or more processing modules and perform a portion of or one or more acts of method 400 (FIG. 4) (e.g., activity 407 (FIG. 4)).

In many embodiments, demand forecast system 307 can comprise non-transitory memory storage module 508. Memory storage module 508 can be referred to as demand forecast module 508. In many embodiments, demand forecast module 508 can store computing instructions configured to run on one or more processing modules and perform a portion of or one or more acts of method 400 (FIG. 4) (e.g., activity 408 (FIG. 4)).

In many embodiments, item level and weekly sales prices system 304 can comprise non-transitory memory storage module 504. Memory storage module 512 can be referred to as item level and weekly sales prices module 504. In many embodiments, as item level and weekly sales prices module 504 can store computing instructions configured to run on one or more processing modules and perform a portion of or one or more acts of method 400 (FIG. 4) (e.g., activities 401 (FIG. 4)).

In many embodiments, optimization system 310 can comprise non-transitory memory storage module 509. Memory storage module 509 can be referred to as optimization module 509. In many embodiments, optimization module 509 can store computing instructions configured to run on one or more processing modules and perform a portion of or one or more acts of method 400 (FIG. 4) (e.g., activity 409 (FIG. 4)).

In many embodiments, item relationship system 305 can comprise non-transitory memory storage module 512. Memory storage module 512 can be referred to as item relationship module 512. In many embodiments, item relationship module 512 can store computing instructions configured to run on one or more processing modules and perform a portion of or one or more acts of method 400 (FIG. 4) (e.g., activity 401-409 (FIG. 4)).

In many embodiments, first external constraint system 308 can comprise non-transitory memory storage module 519. Memory storage module 519 can be referred to as first external constraint module 519. In many embodiments, first external constraint module 519 can store computing instructions configured to run on one or more processing modules and perform a portion of or one or more acts of method 400 (FIG. 4) (e.g., activity 409 (FIG. 4)).

In many embodiments, competitor information system 309 can comprise non-transitory memory storage module 509. Memory storage module 509 can be referred to as competitor information module 509. In many embodiments, competitor information module 509 can store computing instructions configured to run on one or more processing modules and perform a portion of or one or more acts of method 400 (FIG. 4) (e.g., activity 409-410 (FIG. 4)).

In many embodiments, second external constraint system 311 can comprise non-transitory memory storage module 510. Memory storage module 510 can be referred to as price adjustment module 510. In many embodiments, price adjustment module 510 can store computing instructions configured to run on one or more processing modules and perform a portion of or one or more acts of method 400 (FIG. 4) (e.g., activity 410 (FIG. 4)). In the same or different embodiments, second external constraint system 311 can comprise non-transitory memory storage module 520. Memory storage module 520 can be referred to as second external constraint module 520. In many embodiments, second external constraint module 520 can store computing instructions configured to run on one or more processing modules and perform a portion of or one or more acts of method 400 (FIG. 4) (e.g., activity 410 (FIG. 4)).

In many embodiments, display system 312 can comprise non-transitory memory storage module 511. Memory storage module 511 can be referred to as display module 511. In many embodiments, display module 511 can store computing instructions configured to run on one or more processing modules and perform a portion of or one or more acts of method 400 (FIG. 4) (e.g., activity 411 (FIG. 4)).

Although systems and methods for algorithmic pricing have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processor, cause the one or more processers to perform functions comprising:
calculating a halo weight for at least one item of a set of items by dividing a halo revenue by a unit metric, wherein the halo revenue is generated by the at least one item, wherein the unit metric comprises a number of units sold of the at least one item, and wherein the halo weight comprises an effect that sales of the at least one item has on sales of the set of items;
calculating an item-wise elasticity for the at least one item of the set of items;
calculating a line-wise elasticity for the at least one item of the set of items;
calculating an aggregate elasticity for the at least one item using the item-wise elasticity and the line-wise elasticity;
accessing a database comprising sales data and price data for the set of items;
dividing the sales data and the price data for the at least one item into a training data set and a test data set;
training different models on the training data set;
determining respective accuracy of each model of the different models, as trained, using the test data set;
calculating a demand forecast for the at least one item of the set of items using a most accurate model of the different models, as trained;
optimizing an objective function comprising the halo weight, the aggregate elasticity, the demand forecast, at least one external constraint, a linearized elasticity of the at least one item, and an optimized price of the at least one item;
adjusting at least one price of the at least one item based on the objective function, as optimized; and
displaying the at least one price, as adjusted, for the at least one item on a display device of a user.

2. The system of claim 1, wherein:
the computing instructions, when executed on the one or more processors, further cause the one or more processors to perform functions comprising:
excluding items from the set of items that do not meet predetermined requirements; and
selecting line items and ladder items of items not excluded from the set of items; and
the at least one item comprises the items not excluded from the set of items, the line items, and the ladder items.

3. The system of claim 1, wherein calculating the demand forecast for the at least one item of the set of items comprises:
aggregating the sales data and the price data for the at least one item over one or more stores for a predefined period of time; and
calculating the demand forecast for the at least one item of the set of items using (a) the sales data and the price data, as aggregated, and (b) at least one of:
an exponential weighted moving average model;
a generalized linear model with a log-link function; or
an autoregressive moving average model.

4. The system of claim 1, wherein:
the most accurate model of the different models, as trained, comprises an exponential weighted moving average model, a generalized linear model with a log-link function, or an autoregressive moving average model; and
the objective function further comprises the most accurate model.

5. The system of claim 1, wherein optimizing the objective function comprises:
maximizing overall market sales for the set of items; and
maximizing a total expected volume for the at least one item of the set of items weighted by the halo weight.

6. The system of claim 1, wherein the at least one external constraint comprises at least one of:
the at least one price of the at least one item, as adjusted, is lower than at least one pre-adjustment price of the at least one item;
a total profit loss due to the at least one price, as adjusted, of the at least one item is lower than a predetermined budget;
line items of the at least one item have a same price as the at least one price, as adjusted, of the at least one item; or
ladder items of the at least one item have a lower unit price than at least one unit price of the at least one item.

7. The system of claim 6, wherein:
the at least one external constraint comprises at least two external constraints; and
the computing instructions, when executed on the one or more processors, further cause the one or more processors to perform functions comprising:
identifying a conflict between the at least two external constraints, the at least two external constraints comprising:
(1) the line items of the at least one item have the same price as the at least one price of the at least one item, as adjusted; and
(2) the ladder items of the at least one item have the lower unit price than the unit price of the at least one item, as adjusted; and
in response to identifying the conflict, applying (1) before applying (2).

8. The system of claim 1, wherein the halo revenue generated by the at least one item comprises a sum of revenue generated by a second set of items, the set of items comprising the second set of items, and the second set of items having an affinity for the at least one item.

9. The system of claim 1, wherein the objective function comprises:
max $\Sigma_i w_i(v_i + \gamma_i(p_i - \hat{p}_i))$, wherein $w_i$ comprises the halo weight for the at least one item, $v_i$ comprises the demand forecast of the at least one item at price point $\hat{p}_i$, $\gamma_i$ comprises the linearized elasticity of the at least one item, and $p_i$ comprises the optimized price of the at least one item.

10. A method being implemented via execution of computing instructions configured to run at one or more processors and configured to be stored at non-transitory computer-readable media, the method comprising:
calculating a halo weight for at least one item of a set of items by dividing a halo revenue by a unit metric, wherein the halo revenue is generated by the at least one item, wherein the unit metric comprises a number of units sold of the at least one item, and wherein the halo weight comprises an effect that sales of the at least one item has on sales of the set of items;
calculating an item-wise elasticity for the at least one item of the set of items;
calculating a line-wise elasticity for the at least one item of the set of items;
calculating an aggregate elasticity for the at least one item using the item-wise elasticity and the line-wise elasticity;
accessing a database comprising sales data and price data for the set of items;
dividing the sales data and the price data for the at least one item into a training data set and a test data set;
training different models on the training data set;
determining respective accuracy of each model of the different models, as trained, using the test data set;
calculating a demand forecast for the at least one item of the set of items using a most accurate model of the different models, as trained;
optimizing an objective function comprising the halo weight, the aggregate elasticity, the demand forecast, at least one external constraint, a linearized elasticity of the at least one item, and an optimized price of the at least one item;
adjusting at least one price of the at least one item based on the objective function, as optimized; and
displaying the at least one price, as adjusted, for the at least one item on a display device of a user.

11. The method of claim 10, wherein:
the method further comprises:
excluding items from the set of items that do not meet predetermined requirements; and
selecting line items and ladder items of items not excluded from the set of items; and
the at least one item comprises the items not excluded from the set of items, the line items, and the ladder items.

12. The method of claim 10, wherein calculating the demand forecast for the at least one item of the set of items comprises:
aggregating the sales data and the price data for the at least one item over one or more stores for a predefined period of time; and
calculating the demand forecast for the at least one item of the set of items using (a) the sales data and (b) the price data as aggregated and at least one of:
an exponential weighted moving average model;
a generalized linear model with a log-link function; or
an autoregressive moving average model.

13. The method of claim 10, wherein:
the most accurate model of the different models, as trained, comprises an exponential weighted moving average model, a generalized linear model with a log-link function, or an autoregressive moving average model; and
the objective function further comprises the most accurate model.

14. The method of claim 10, wherein optimizing the objective function comprises:
maximizing overall market sales for the set of items; and
maximizing a total expected volume for the at least one item of the set of items weighted by the halo weight.

15. The method of claim 10, wherein the at least one external constraint comprises at least one of:
the at least one price of the at least one item, as adjusted, is lower than at least one pre-adjustment price of the at least one item;

a total profit loss due to the at least one price, as adjusted, of the at least one item is lower than a predetermined budget;

line items of the at least one item have a same price as the at least one price, as adjusted, of the at least one item; or ladder items of the at least one item have a lower unit price than at least one unit price of the at least one item.

16. The method of claim 15, wherein:

the at least one external constraint comprises at least two external constraints; and the method further comprises:
- identifying a conflict between the at least two external constraints, the at least two external constraints comprising:
  - (1) the line items of the at least one item have the same price as the at least one price of the at least one item as adjusted; and
  - (2) the ladder items of the at least one item have the lower unit price than the unit price of the at least one item as adjusted; and
- in response to identifying the conflict, applying (1) before applying (2).

17. The method of claim 10, wherein the halo revenue generated by the at least one item comprises a sum of revenue generated by a second set of items, the set of items comprising the second set of items, and the second set of items having an affinity for the at least one item.

18. The method of claim 10, wherein the objective function comprises:

max $\Sigma_i w_i(v_i+\gamma_i(p_i-\hat{p}_i))$, wherein $w_i$ comprises the halo weight for the at least one item, $v_i$ comprises the demand forecast of the at least one item at price point $\hat{p}_i$, $\gamma_i$ comprises the linearized elasticity of the at least one item, and $p_i$ comprises the optimized price of the at least one item.

19. The system of claim 1, wherein:

the most accurate model of the different models, as trained, comprises an exponential weighted moving average model, a generalized linear model with a log-link function, or an autoregressive moving average model;

the objective function further comprises the most accurate model; and optimizing the objective function comprises:
- maximizing overall market sales for the set of items; and
- maximizing a total expected volume for the at least one item of the set of items weighted by the halo weight.

20. The method of claim 10, wherein:

the most accurate model of the different models, as trained, comprises an exponential weighted moving average model, a generalized linear model with a log-link function, or an autoregressive moving average model;

the objective function further comprises the most accurate model; and optimizing the objective function comprises:
- maximizing overall market sales for the set of items; and
- maximizing a total expected volume for the at least one item of the set of items weighted by the halo weight.

* * * * *